US010871032B2

(12) United States Patent
Chambers et al.

(10) Patent No.: US 10,871,032 B2
(45) Date of Patent: Dec. 22, 2020

(54) DEVICE INCLUDING A SEAL ASSEMBLY

(71) Applicant: Halliburton Energy Services, Inc., Houston, TX (US)

(72) Inventors: Larry DeLynn Chambers, Kingwood, TX (US); Mark Anthony Sitka, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 201 days.

(21) Appl. No.: 16/064,136

(22) PCT Filed: Mar. 10, 2016

(86) PCT No.: PCT/US2016/021711
§ 371 (c)(1),
(2) Date: Jun. 20, 2018

(87) PCT Pub. No.: WO2017/155536
PCT Pub. Date: Sep. 14, 2017

(65) Prior Publication Data
US 2019/0003257 A1    Jan. 3, 2019

(51) Int. Cl.
*E21B 41/00* (2006.01)
*E21B 4/00* (2006.01)
*E21B 47/14* (2006.01)
*F16J 15/16* (2006.01)

(52) U.S. Cl.
CPC .............. *E21B 4/003* (2013.01); *E21B 41/00* (2013.01); *E21B 47/14* (2013.01); *F16J 15/162* (2013.01)

(58) Field of Classification Search
CPC ...................................................... E21B 41/00
See application file for complete search history.

(56) References Cited

U.S. PATENT DOCUMENTS

| 4,309,040 A | 1/1982 | Pierrat |
| 4,502,700 A | 3/1985 | Gowda et al. |
| 4,505,485 A | 3/1985 | Hirakawa |
| 5,230,520 A | 7/1993 | Dietle et al. |
| 5,517,774 A * | 5/1996 | Rogers ................. E21B 3/02 173/150 |
| 5,803,169 A | 9/1998 | Bassinger et al. |
| 5,823,541 A | 10/1998 | Dietle et al. |

(Continued)

FOREIGN PATENT DOCUMENTS

| WO | WO 2008/147450 A1 | 12/2008 |
| WO | WO 2010/148028 A1 | 12/2010 |

OTHER PUBLICATIONS

International Search Report and the Written Opinion of the International Search Authority, or the Declaration, dated Dec. 7, 2016, PCT/US2016/021711, 14 pages, ISA/KR.

*Primary Examiner* — Giovanna Wright
(74) *Attorney, Agent, or Firm* — Haynes and Boone, LLP (57) ABSTRACT

A device comprising a housing having a longitudinal dimension; a linear actuator including a casing coupled to the housing; an actuator shaft having an exterior surface and configured to be longitudinally translated relative to the casing; and a seal assembly engaging the housing and sealingly engaging the exterior surface. The device also comprising a motor assembly disposed within the housing, the motor assembly including a motor case and a motor shaft, the motor shaft configured to rotate one of the seal assembly or the actuator shaft.

20 Claims, 7 Drawing Sheets

(56) References Cited

U.S. PATENT DOCUMENTS

| | | | | |
|---|---|---|---|---|
| 6,138,754 | A | * | 10/2000 | Veneruso .............. E21B 34/066 |
| | | | | 166/250.03 |
| 6,227,547 | B1 | | 5/2001 | Dietle et al. |
| 2002/0006345 | A1 | | 1/2002 | Gerlach |
| 2009/0133881 | A1 | * | 5/2009 | Roodenburg ........... B63B 27/30 |
| | | | | 166/355 |
| 2012/0168176 | A1 | | 7/2012 | Aguirre et al. |
| 2013/0278098 | A1 | | 10/2013 | Bourqui et al. |
| 2014/0299381 | A1 | | 10/2014 | Sihler |

* cited by examiner

DEVICE INCLUDING A SEAL ASSEMBLY

PRIORITY

The present application is a U.S. National Stage patent application of International Patent Application No. PCT/US2016/021711, filed on Mar. 10, 2016, the benefit of which is claimed and the disclosure of which is incorporated herein by reference in its entirety.

BACKGROUND

Oil well tools and apparatus may include sealed shafts that translate along a longitudinal axis. Typically, linear reciprocating seals use wipers to keep abrasives out of the seal area and, over a short time, the wipers wear out and the seals break down causing mud to infiltrate the oil. Some linearly translating shafts may require a constant rotational orientation. Linearly translating shafts may receive too little or uneven lubrication which may cause early seal wear or destruction. Improper lubrication may also lead to build-up of debris on the shaft. Linearly translating shafts may become packed with lost circulation material (LCM) or silt at a seal interface and could become locked up.

BRIEF DESCRIPTION OF THE DRAWINGS

Some embodiments are illustrated by way of example and not limitation in the figures of the accompanying drawings in which.

DETAILED DESCRIPTION

An example of the disclosure comprises a system and device including a seal assembly. Seal assemblies used on linearly translating shafts may be improved by rotating a seal or by rotating the shaft. Rotary seals may be used in applications that have varying speeds. Because the rotary motion may not be used in a linear application, the rotation can be set to the ideal condition for the seal, making it last longer. By rotating the seal or the shaft, a film of lubricant may be maintained under the seal and the shaft surface may be kept cleaner. In another example, a locked up shaft may be freed by having the shaft rotated by a motor assembly.

Figure 1:
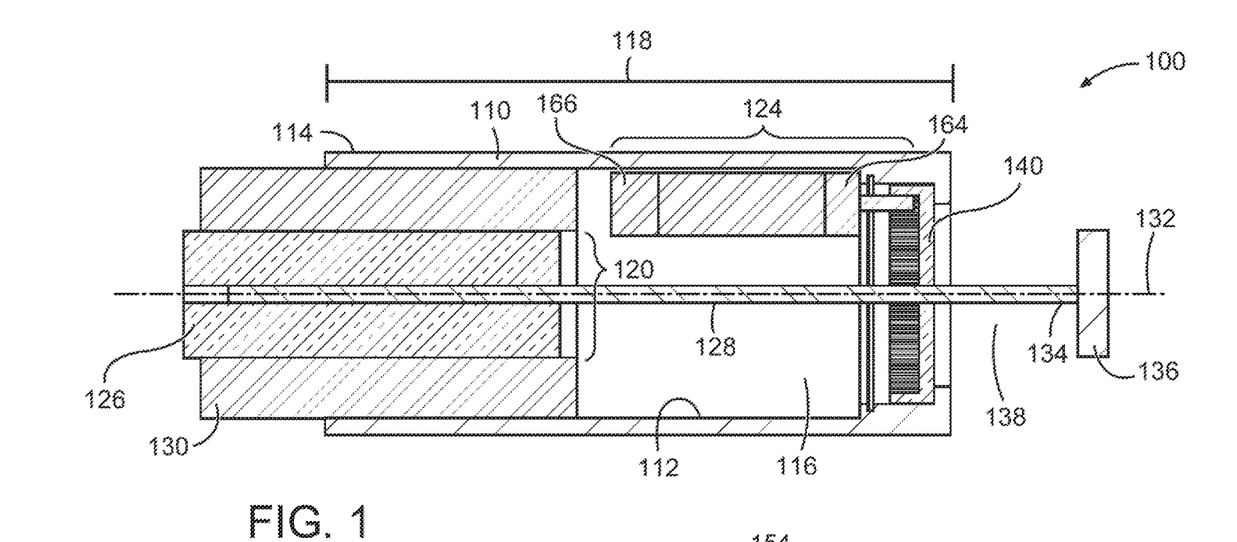
FIG. 1 illustrates a cross section view of a device including a rotating seal assembly, in accordance with at least one example of the present disclosure.
Figure 2:
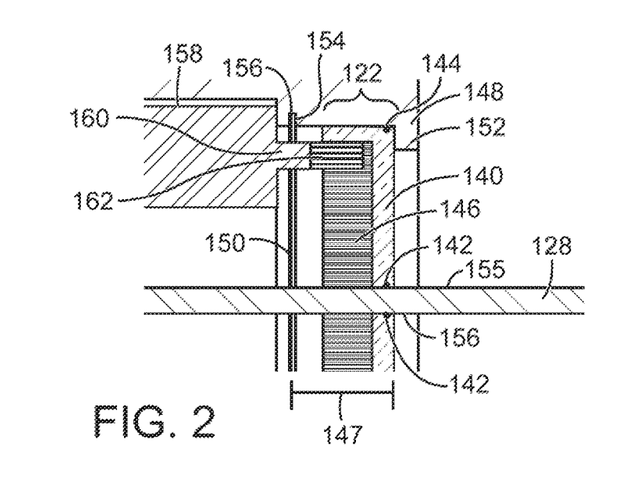
FIG. 2 illustrates a close up view of the device of FIG. 1, in accordance with at least one example of the present disclosure.

FIG. 1 illustrates a cross section view of a device 100 including a rotating seal assembly, in accordance with at least one example of the present disclosure. FIG. 2 illustrates a close up view of the device of FIG. 1, in accordance with at least one example of the present disclosure. Referring to FIGS. 1-2, the device 100 may be a tool assembly and may be used in a downhole environment such as a drillstring tool or a wireline tool. The device 100 may include a housing 110 having a longitudinal dimension 118, a linear actuator 120, a seal assembly 122, and a motor assembly 124.

The housing 110 may be cylindrical, having a round cross section or may have other cross sectional shapes such as rectangular or an otherwise irregularly shaped cross section including curved and/or straight portions. The housing 110 may include an inner surface 112 and an outer surface 114 where the inner surface 112 may define a first cavity 116. The housing 110 may be a structural member and may be formed of metals, metal alloys, polycarbonates, polymers, composites or combinations of the aforementioned materials.

The linear actuator 120 may be at least partially located within the housing 110 and may include a casing 126 and an actuator shaft 128. The casing 126 may be coupled to the housing 110. An intermediate structure 130 may be between the casing 126 and the housing 110. When energized, the linear actuator 120 may linearly translate the actuator shaft 128 along a longitudinal axis 132 generally parallel to the longitudinal dimension 118. The actuator shaft 128 may move back and forth relative to the casing 126. The actuator shaft 128 can be movably coupled to the casing 126. Although the linear actuator 120 is illustrated and described as having a case 126 and an intermediate structure 130, various configurations are all contemplated by the inventors without changing the intent of this disclosure. For example the linear actuator 120 can be configured as a solenoid type with the intermediate structure 130 being a stator and a magnetic field can cause the actuator shaft 128 to translate. In another example, the linear actuator can include a geared track that can be electrically powered to translate the actuator shaft 128. In another example the linear actuator 120 may be hydraulically or pneumatically powered and the actuator shaft 128 may be translated by changing hydraulic or pneumatic pressures.

A first end 134 of the actuator shaft 128 may be coupled to a part 136. The part 136 may be any portion or assembly or sub-assembly of a tool, a device, or a system that is used in a downhole environment. The part 136 may be located in a second cavity 138. Contents or fluids that are located in the first cavity 116 may be kept separate from contents or fluids that are located in the second cavity 138 by the seal assembly 122. For example, the first cavity 116 may contain a lubricant. The second cavity 138 may contain a drilling mud, crude petroleum, or other fluids. The seal assembly 122 can maintain the separation of fluids between the first cavity 116 and the second cavity 138. This can prevent contamination of devices/fluids located in the housing 110. In an example, the part 136 may be required to maintain a specific orientation, so that rotation of the actuator shaft 128 may need to be minimized or not allowed. In another example, the part 136 and the actuator shaft 128 may be free to rotate as desired.

The seal assembly 122 may include a seal body 140, a first seal 142, a second seal 144, and a ring gear 146. The seal body 140 may be a separate structure including portions that may retain the first seal 142 or the second seal 144, or the seal body 140 may be integrally formed with one or more seals such as the first seal 142 and the second seal 144. The seal body 140 may be more rigid than the seals 142, 144. The seal body 140 may be a different material than the seals 142, 144. The device 100 may include a first seal retainer 148 and a second seal retainer 150. The first and second seal retainers 148, 150 may be formed integrally with the housing 110 such as the lip 152 or may be a separate piece such as a ring 154 (e.g., circlip) that is retained in a groove 156 of the housing 110. The seal retainers 148, 150, may limit the seal assembly 122 from translation along the longitudinal dimension 118 and may allow the seal assembly to rotate within the housing 110. The ring gear 146 may be bonded to the seal body 140 or may be an integral portion of the seal body 140. The actuator shaft 128 may extend through the seal assembly 122 at the first seal 142 and the first seal 142 may sealingly engage an exterior surface 155 of the actuator shaft 128.

Some of the seals discussed in the present application are dynamic, in other words, one or more of the sealing surfaces moves. For example, seals around a moving linear actuator shaft can be dynamic. Some of the seals discussed in the present application are static, in other words, the seal functions against mating surfaces that have no relative motion between each other. The seal described above that rotates within the housing can include dynamic seals on the inside diameter sealing the actuator shaft and on the outside diameter sealing between the seal assembly 122 and the housing 110. In an example, the seal assembly 122, can include integrated bushings associated with either or both of the inside diameter or the outside diameter.

The motor assembly 124 may be coupled either directly or indirectly to the housing 110. The motor assembly 124 may include a motor case 158, a motor shaft 160, a motor gear 162, a gearbox 164, and a motor controller 166. The motor assembly 124 may be powered by electricity, by hydraulic pressures, or by pneumatic pressures. The motor assembly 124 may be controlled at a location that is remote from the location of the motor assembly 124. The motor case 158 may be an exterior housing that may include the motor shaft 160. The motor shaft 160 may be rotated in either direction relative to the motor casing 126. The motor shaft 160 may include an integral motor gear 162 or the motor gear 162 may be a separate piece coupled to the motor shaft 160. The motor gear 162 may mate with the ring gear 146 and when the motor assembly 124 is actuated a rotating motor gear 162 may engage the ring gear 146 and may cause the seal assembly 122 to rotate within the housing 110.

The motor controller 166 of the motor assembly 124 may be integral with the motor assembly 124 or may be located at a remote location from the motor assembly 124. The motor controller 166 may control starting and stopping of the motor assembly 124 as well as providing variable speeds to the motor gear 162. In another example, the motor shaft 160 may be coupled to a gearbox 164 that may provide one or more speeds to the motor gear 162. Rotation of the seal assembly 122 may provide a uniform and/or optimum lubrication of the seal assembly 122. The first seal 142 and/or second seal 144 may be maintained in a cleaner well lubricated fashion by the rotation of the seal assembly 122.

The rotation speed and timing may be optimized to extend first and/or second seal 142, 144 life. For example, if the actuator shaft 128 is not moving, the seal assembly 122 could remain stationary and friction between the seals 142, 144 and the exterior surface 155 would be minimized. Before linear translation of the actuator shaft 128, the motor assembly 124 may be energized and the seal assembly 122 may be rotated. The rotation of the seal assembly 122 may cause the exterior surface 155 and/or the seal surfaces of the seal assembly 122 to become lubricated by the lubricant located in the first cavity 116. In addition, the rotation of the seal assembly 122 may cause dirt and debris at the seal assembly 122 to be removed and the actuator shaft 128 may be cleaned before linear translation of the actuator shaft 128.

In an example, the device 100 may include a distance 147 between the first seal retainer 148 and the second seal retainer 150 that is configured so that the seal assembly 122 may translate along the longitudinal axis 132. Differential pressures between the first cavity 116 and the second cavity 138 may cause the seal assembly 122 to move back and forth and maintain and equalize pressures between the first cavity 116 and the second cavity 138. For example, when the actuator shaft 128 moves towards the second cavity 138, the pressure may be lessened in the first cavity 116. The seal assembly 122 may move towards the first cavity 116 and aid in equalizing pressures. Such equalization may prolong seal life and minimize fluid leakage at the seal assembly 122. Although the seal assembly 122 is shown as located at an end of the housing 110, it may be located at any point in the housing 110.

Figure 3A:
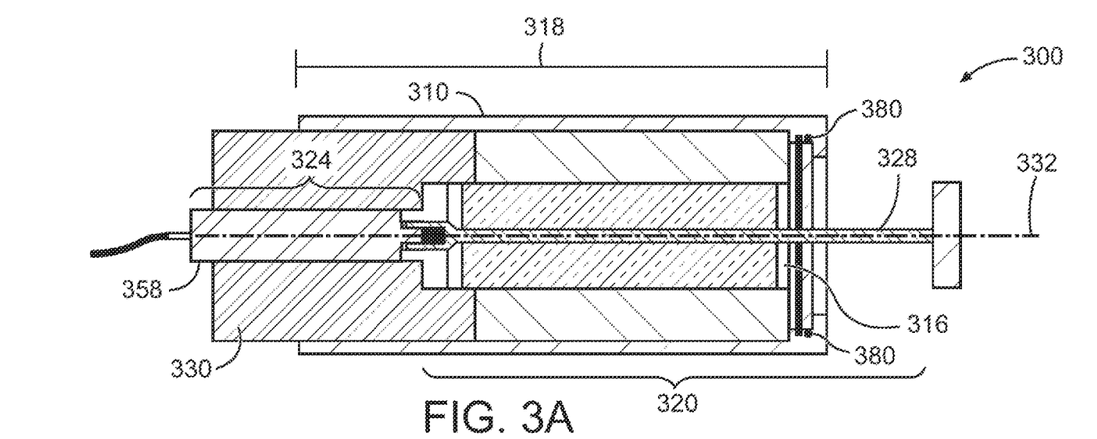
FIG. 3A illustrates a cross section view of a device including a rotating actuator shaft, in accordance with at least one example of the present disclosure.
Figure 3B:
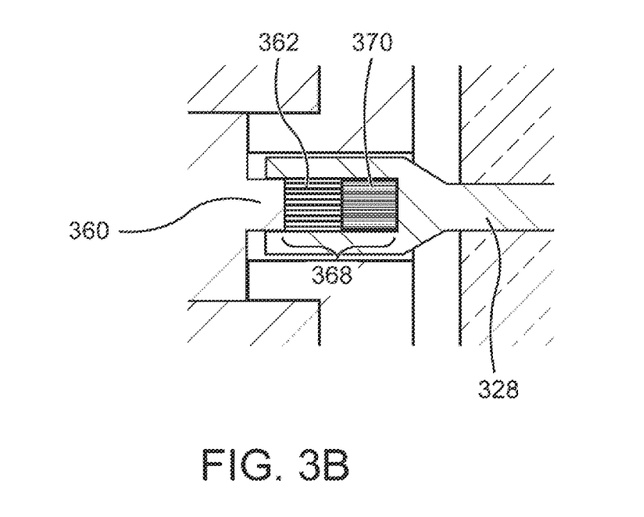
FIG. 3B illustrates a close up view of the device of FIG. 3A, in accordance with at least one example of the present disclosure.
Figure 3C:
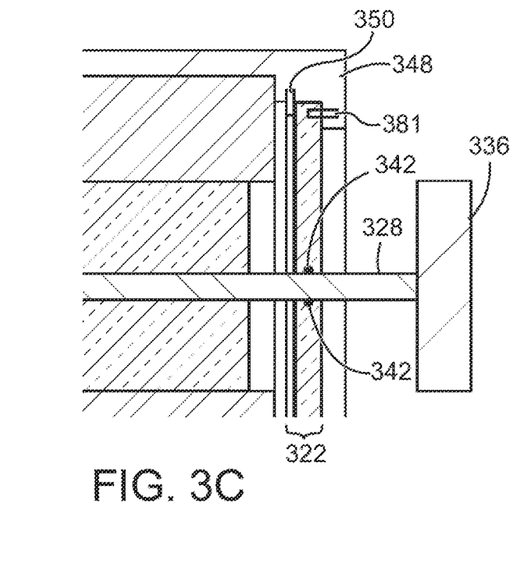
FIG. 3C illustrates a close up view of the device of FIG. 3A, in accordance with at least one example of the present disclosure.

FIG. 3A illustrates a cross section view of a device 300 including a rotating actuator shaft, in accordance with at least one example of the present disclosure. FIG. 3B illustrates a close up view of the device of FIG. 3A, in accordance with at least one example of the present disclosure. FIG. 3C illustrates a close up view of the device of FIG. 3A, in accordance with at least one example of the present disclosure. Referring to FIGS. 3A-3C, in an example, the device 300 may include a part 336 that does not require a certain orientation and may be rotated. Similar to the above description, the device 300 may include a housing 310 having a longitudinal dimension 318, a linear actuator 320, a seal assembly 322, and a motor assembly 324. The seal assembly 322 may include a first seal 342. The actuator shaft 328 may extend through the first seal 342. The actuator shaft 328 may be linearly translated back and forth along a longitudinal axis 332 that may be generally parallel with the longitudinal dimension 318. The seal assembly 322 may be retained by a first seal retainer 348 and a second seal retainer 350. In an example, the seal assembly 322 may be fixed relative to the housing 310. The seal assembly 322 can include an outside diameter seal 380. In an example the outside diameter seal 380 can be a static seal.

FIG. 3C illustrates an anti-rotation key 381. The anti-rotation key 381 can be a pin, a square key, or a structure protruding from the housing 310. The anti-rotation key 381 can engage the seal assembly 322 and prevent any rotation due to torque of the rotating actuator shaft 328.

The motor case 358 may be fixedly coupled to the housing 310. The motor shaft 360, or a motor gear 362 coupled to the motor shaft 360, may be movably coupled to the actuator shaft 328. In an example, a mating spline connection 368 between the actuator shaft 328 and the motor gear 362 may allow the motor gear 362 or the motor shaft 360 to rotate the actuator shaft 328, while allowing the actuator shaft 328 to translate along the longitudinal axis 332. The rotation of the actuator shaft 328 may clean and lubricate the first seal 342 reducing wear and increasing both first seal 342 and actuator shaft 328 life. In an example, the motor assembly 324 may rotate the actuator shaft 328 before linear translation of the actuator shaft. Such prior rotation may assure that the first seal 342 is well cleaned and/or lubricated before linear translation of the actuator shaft 328.

Although the coupling between the motor shaft 360 and the actuator shaft 328 illustrates the motor shaft 360 surrounded by splines 370 of the actuator shaft 328, the inventors have contemplated other types of movable couplings between the motor shaft 360 and the actuator shaft 328, such as having the motor shaft 360 exterior to the actuator shaft 328.

In another example, the part 336 or the actuator shaft 328 may become packed with lost circulation material (LCM) or silt at a seal interface and could become locked up. Rotation of the actuator shaft 328 may clean and loosen the actuator shaft 328 and/or loosen a locked part 336. A first cavity 316 may include a volume of lubricant.

The device 300 may include an intermediate structures 330 between the motor case 358 and the housing 310, that aid in coupling the motor assembly 324 to the housing 310 and/or aid in sealing the motor end of the housing 310.

Figure 4:
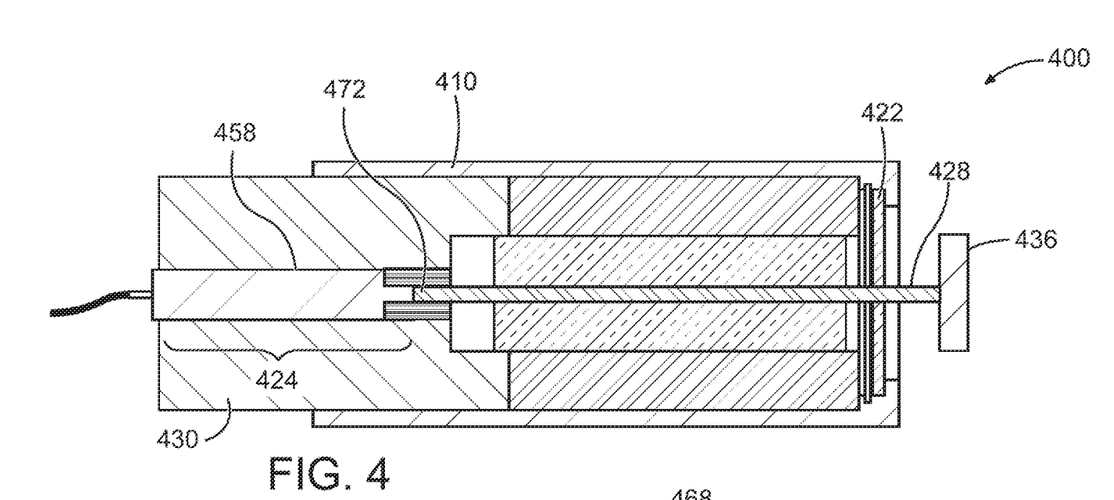
FIG. 4 illustrates a cross section view of a device including a rotating actuator shaft, in accordance with at least one example of the present disclosure.
Figure 5:
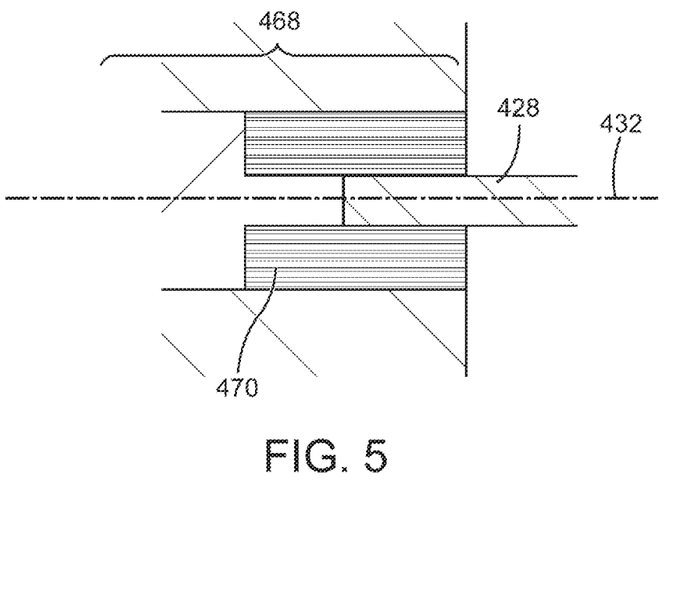
FIG. 5 illustrates a close up view of the device of FIG. 4, in accordance with at least one example of the present disclosure.

FIG. 4 illustrates a cross section view of a device 400 including a rotating actuator shaft, in accordance with at least one example of the present disclosure. FIG. 5 illustrates a close up view of the device of FIG. 4, in accordance with at least one example of the present disclosure. Referring to FIGS. 4-5, the device 400 may be similar to the device 300 as described in FIGS. 3A-C, in that the part 436 may be allowed to rotate. The device 400 may include a motor assembly 424 having a motor case 458 that may be movably coupled to the housing 410. A motor shaft 460 may be fixedly coupled to a second end 472 of an actuator shaft 428. The actuator shaft 428 may move linearly back and forth along a longitudinal axis 432 of the housing 410 as described above. The motor case 458 may include a mating splined connection 468 between the motor case 458 and the housing 410, or a mating splined connection 468 between the motor case 458 and an intermediate structure 430 coupled to the housing 410. The mating splined connection 468 may include a first set of splines (not shown) on the exterior of the motor casing 458 that match a set of splines 470 in intermediate structure 430 (or if the motor casing 458 is directly movably coupled to the housing 410, the device 400 may include a set of splines 470 in the housing 410). The mating splined connection 468 may allow the motor assembly 424 to move back and forth with the movement of the actuator shaft 428. The mating splined connection 468 will allow the motor shaft 460 to rotate the actuator shaft 428, while keeping the motor case 458 from rotating relative to the housing 410. Although the splines 470 are illustrated as inside of the case 410, the splines 470 and mated splined connection 468 can be located outside of the case 410. Lubricant may be sealed at the forward end of the intermediate structure 430 or at sealing points between the moving motor case 458 and the intermediate structure 430. As described above, the rotation of the actuator shaft 428 may clean and lubricate one or more seals in the seal assembly 422.

Figure 6:
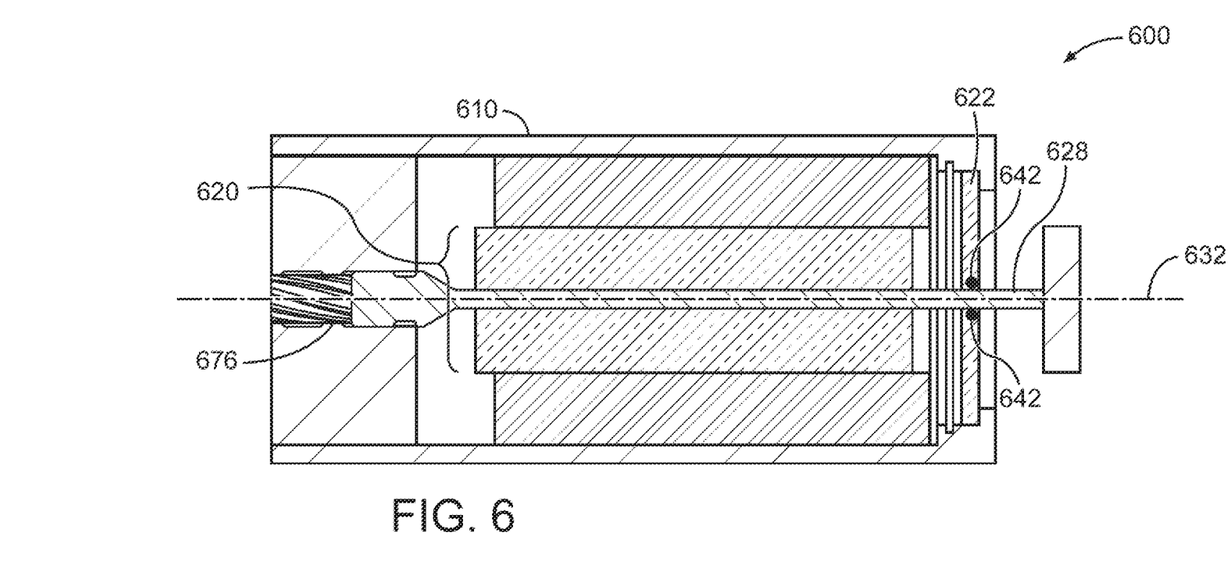
FIG. 6 illustrates a cross section view of a device including a helical cam assembly, in accordance with at least one example of the present disclosure.
Figure 7:
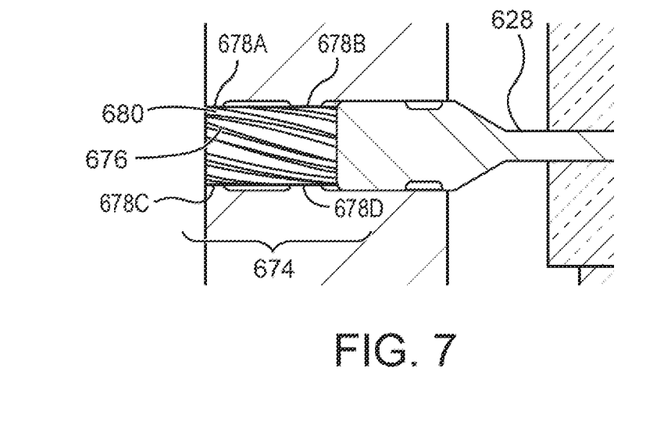
FIG. 7 illustrates a close up view of the device of FIG. 6, in accordance with at least one example of the present disclosure.

FIG. 6 illustrates a cross section view of a device 600 including a helical cam assembly, in accordance with at least one example of the present disclosure. FIG. 7 illustrates a close up view of the device of FIG. 6, in accordance with at least one example of the present disclosure. Referring to FIGS. 6-7, in an example, the actuator shaft 628 may be rotated within the seal assembly 622 without using a motor assembly such as in FIGS. 3A and 4. As part of the seal assembly 622, a seal 642 can seal the actuator shaft 628. The device 600 may include a helical cam assembly 674 having a shaft portion 676 and follower portions 678A, 678B, 678C, and 678D. The shaft portion 676 may be coupled to the actuator shaft 628 or in an example may be integrally formed with the actuator shaft 628. The shaft portion 676 may include helical grooves 680 or helical protrusions that may engage one or more stationary follower portions 678a-d that are coupled to the housing 610. As the linear actuator 620 translates the actuator shaft 628 back and forth along a longitudinal axis 632, the follower portion 678 causes the shaft portion 676 to rotate and thus rotates the actuator shaft 628. The rotation cleans and lubricates the seal assembly 622 as described above. Although the follower portion 678a-d is shown having four tabs, any number of tabs or followers may be used. Although the helical cam assembly 674 is illustrated as inside of the case 610, the helical cam assembly 674 can be located outside of the case 610.

Figure 8:
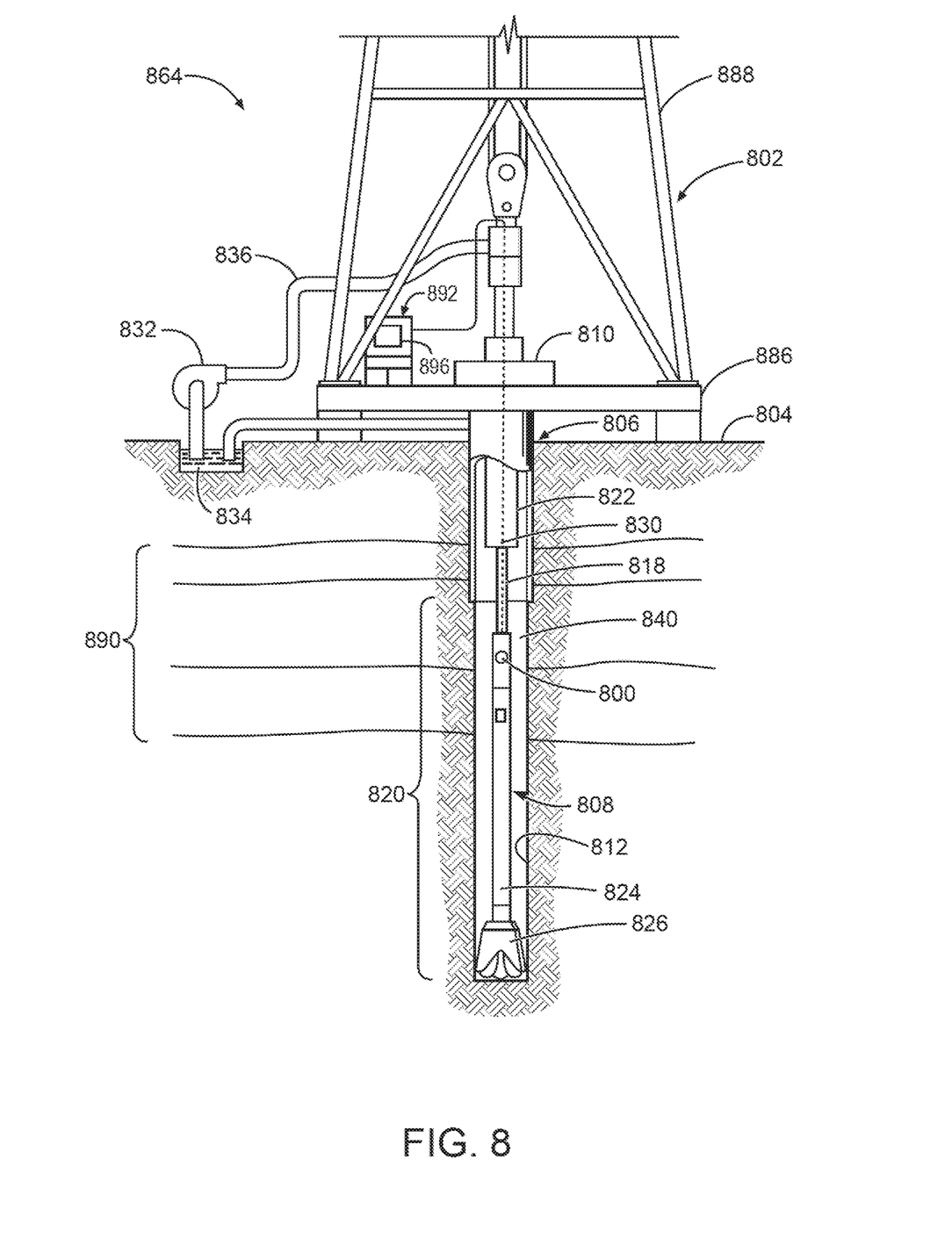
FIG. 8 is a diagram of a drilling system, in accordance with at least one example of the present disclosure.

FIG. 8 is a diagram showing a drilling system, in accordance with at least one example of the present disclosure. The system 864 includes a drilling rig 802 located at the surface 804 of a well 806. The drilling rig 802 may provide support for a drillstring 808. The drillstring 808 may operate to penetrate the rotary table 810 for drilling the borehole 812 through the subsurface formations 890. The drillstring 808 may include a drill pipe 818 and the bottom hole assembly (BHA) 820 (e.g., drill string), perhaps located at the lower portion of the drill pipe 818.

The BHA 820 may include drill collars 822, a downhole tool 824, stabilizers, sensors, an RSS, a drill bit 826, as well as other possible components. The drill bit 826 may operate to create the borehole 812 by penetrating the surface 804 and the subsurface formations 890. The BHA 820 may further include a downhole tool including the device 800 as described previously in FIGS. 1-7. The device 800 in combination with subsequently described controllers may form a tool assembly system.

During drilling operations within the borehole 812, the drillstring 808 (perhaps including the drill pipe 818 and the BHA 820) may be rotated by the rotary table 810. Although not shown, in addition to or alternatively, the BHA 820 may also be rotated by a motor (e.g., a mud motor) that is located downhole. The drill collars 822 may be used to add weight to the drill bit 826. The drill collars 822 may also operate to stiffen the BHA 820, allowing the BHA 820 to transfer the added weight to the drill bit 826, and in turn, to assist the drill bit 826 in penetrating the surface 804 and subsurface formations 890.

During drilling operations, a mud pump 832 may pump drilling fluid (sometimes known by those of ordinary skill in the art as "drilling mud") from a mud pit 834 through a hose 836 into the drill pipe 818 and down to the drill bit 826. The drilling fluid may flow out from the drill bit 826 and be returned to the surface 804 through an annular area 840 between the drill pipe 818 and the sides of the borehole 812. The drilling fluid may then be returned to the mud pit 834, where such fluid is filtered. In some examples, the drilling fluid may be used to cool the drill bit 826, as well as to provide lubrication for the drill bit 826 during drilling operations. Additionally, the drilling fluid may be used to remove subsurface formation cuttings created by operating the drill bit 826.

A workstation 892 including a controller 896 may include modules comprising hardware circuitry, a processor, and/or memory circuits that may store software program modules and objects, and/or firmware, and combinations thereof that are configured to execute at least any methods of using the devices described in FIGS. 1-7. The workstation 892 may also include modulators and demodulators for modulating and demodulating data transmitted downhole through the cable 830 or telemetry received through the cable 830 from the downhole environment. The workstation 892 and controller 896 are shown near the rig 802 only for purposes of illustration as these components may be located at remote locations. The workstation 892 may include the surface portion of the tool assembly system.

These implementations may include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of a non-transitory computer-readable storage medium may include, but not be limited to, read only memory (ROM), random access memory (RAM), a magnetic disk storage device, an optical storage device, a flash memory, and other electronic, magnetic, and/or optical memory devices.

Figure 9:
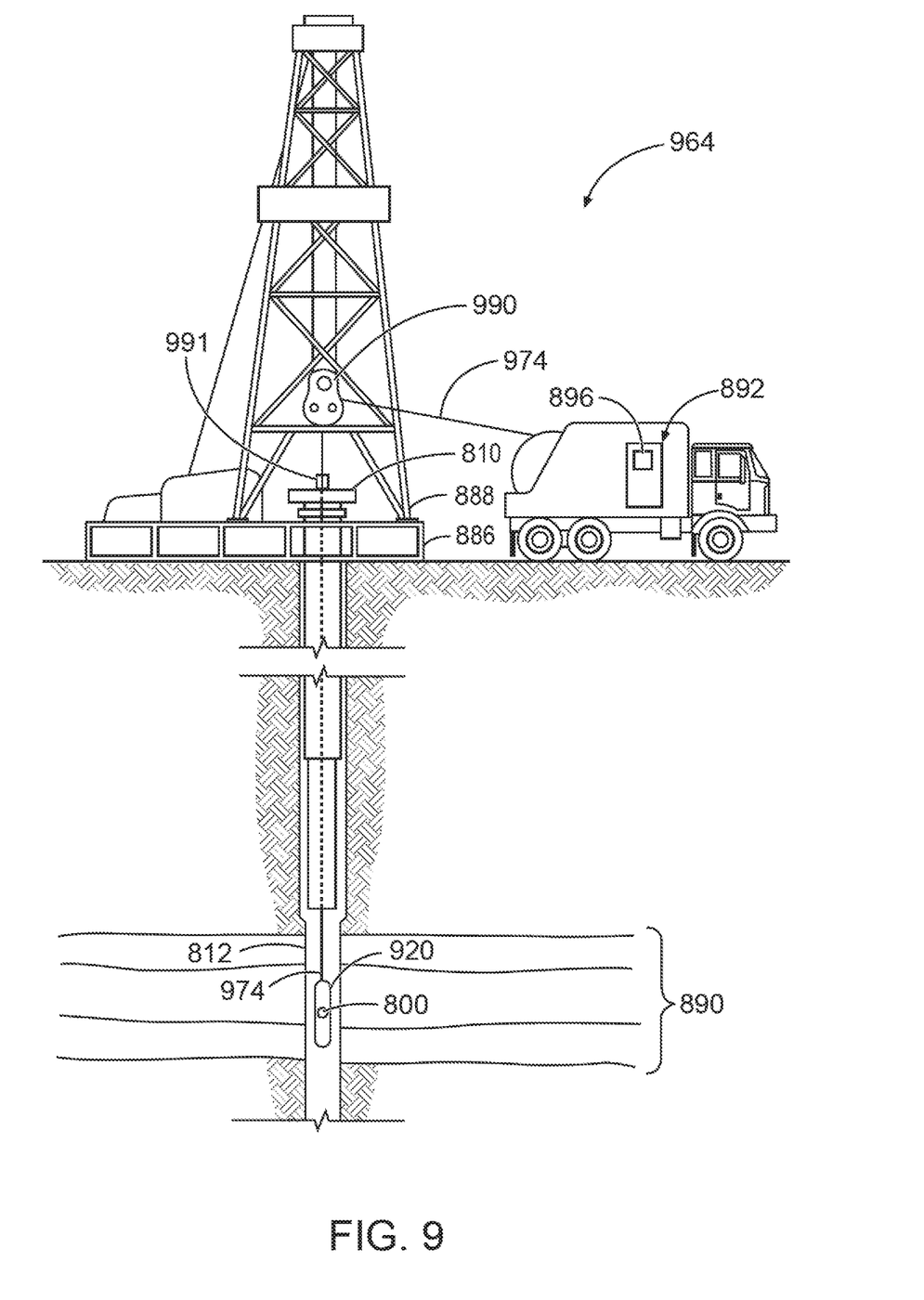
FIG. 9 is a diagram of a wireline system, in accordance with at least one example of the present disclosure.

FIG. 9 is a diagram showing a wireline system 964, in accordance with at least one example of the present disclosure. The system 964 may comprise at least one wireline logging tool body 920, as part of a wireline logging operation in a borehole 812, including the device 800 described previously.

A drilling platform 886 equipped with a derrick 888 that supports a hoist 990 may be seen. Drilling oil and gas wells is commonly carried out using a string of drill pipes connected together so as to form a drillstring that is lowered through a rotary table 810 into the borehole 812. Here it is assumed that the drillstring has been temporarily removed from the borehole 812 to allow the wireline logging tool body 920, such as a probe or sonde with the device 800, to be lowered by wireline or logging cable 974 (e.g., slickline cable) into the borehole 812. Typically, the wireline logging tool body 920 is lowered to the bottom of the region of interest and subsequently pulled upward at a substantially constant speed.

During the upward trip, at a series of depths, a tool assembly with the device 800, as part of an imaging tool system, may be used to image the formation and perform formation parameter retrieval. The resulting imaging data may be communicated to a surface logging facility (e.g., workstation 892) for processing, analysis, and/or storage of the formation parameters. The workstation 892 may have a controller 896 that is able to execute any methods of using the device 800 as disclosed herein and to operate as part of the tool assembly tool system.

Figure 10:
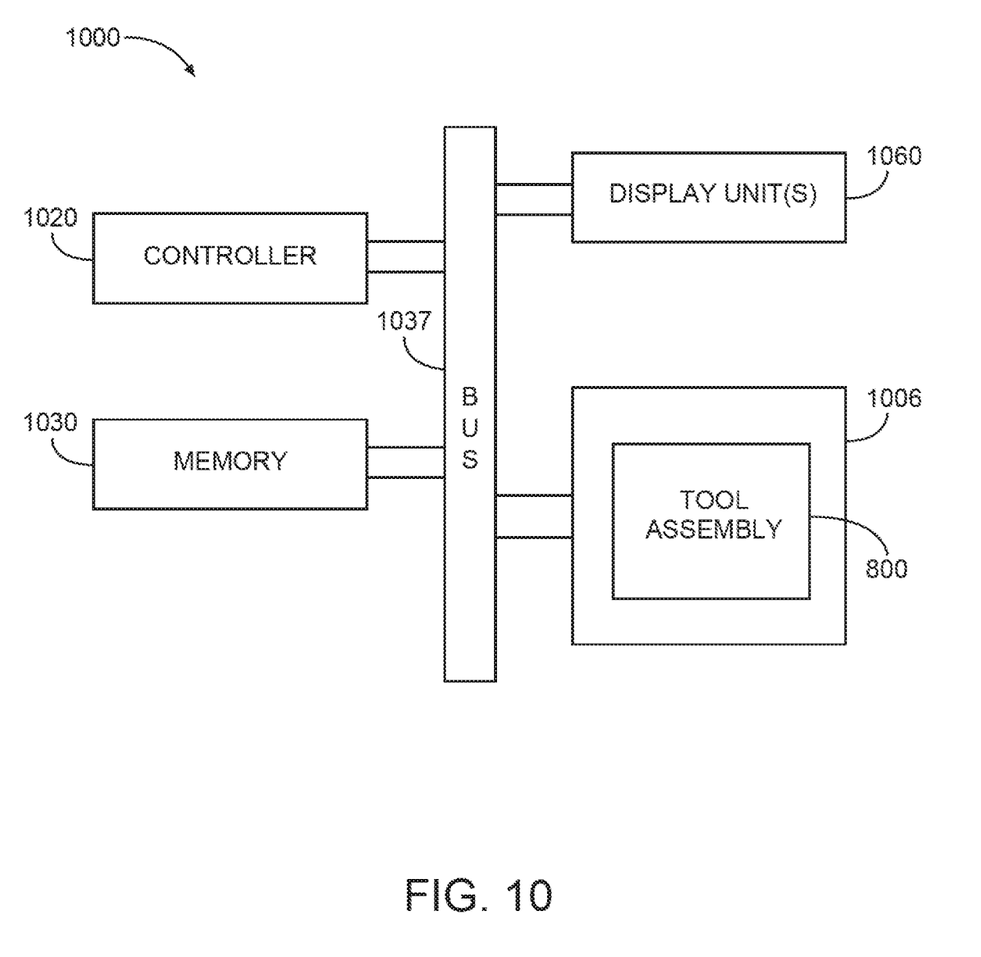
FIG. 10 is a block diagram of an example system operable to implement the activities of multiple methods, in accordance with at least one example of the present disclosure.

FIG. 10 is a block diagram of an example system 1000 operable to implement the activities of multiple methods, in accordance with at least one example of the present disclosure. The system 1000 may include a tool housing 1006 having the device 800 disposed therein. The system 1000 may be implemented as shown in FIGS. 8 and 9 with reference to the workstation 892 and controller 896.

The system 1000 may include a controller 1020, a memory 1030, and a communications unit 1035. The memory 1030 may be structured to include a database. The controller 1020, the memory 1030, and the communications unit 1035 may be arranged to operate as a processing unit to control operation of the device 800 and execute any methods of using the devices disclosed herein in order to control any or all of the linear actuator, the motor assembly, and the part.

The communications unit 1035 may include communications capability for communicating from downhole to the surface or from the surface to downhole. Such communications capability may include a telemetry system such as mud pulse telemetry. In another example, the communications unit 1035 may use combinations of wired communication technologies and wireless technologies. The part described in FIGS. 1-7 may be part of a mud telemetry system.

The system 1000 may also include a bus 1037 that provides electrical conductivity among the components of the system 1000. The bus 1037 may include an address bus, a data bus, and a control bus, each independently configured or in an integrated format. The bus 1037 may be realized using a number of different communication mediums that allows for the distribution of components of the system 1000. The bus 1037 may include a network. Use of the bus 1037 may be regulated by the controller 1020.

The system 1000 may include display unit(s) 1060 as a distributed component on the surface of a wellbore, which may be used with instructions stored in the memory 1030 to implement a user interface to monitor the operation of the tool 1006 or components distributed within the system 1000. The user interface may be used to input parameter values for thresholds such that the system 1000 may operate autonomously substantially without user intervention in a variety of applications. The user interface may also provide for manual override and change of control of the system 1000 to a user. Such a user interface may be operated in conjunction with the communications unit 1035 and the bus 1037.

These implementations may include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of machine-readable storage devices may include, but are not limited to, read only memory (ROM), random access memory (RAM), a magnetic disk storage device, an optical storage device, a flash memory, and other electronic, magnetic, and/or optical memory devices.

The following detailed description describes example embodiments of the disclosure with reference to the accompanying drawings, which depict various details of examples that show how various aspects of the disclosure may be practiced. The discussion addresses various examples of novel methods, systems, devices and apparatuses in reference to these drawings, and describes the depicted embodiments in sufficient detail to enable those skilled in the art to practice the disclosed subject matter. Many embodiments other than the illustrative examples discussed herein may be used to practice these techniques. Structural and operational changes in addition to the alternatives specifically discussed herein may be made without departing from the scope of this disclosure.

In this description, references to "one embodiment" or "an embodiment," or to "one example" or "an example" in this description are not intended necessarily to refer to the same embodiment or example; however, neither are such embodiments mutually exclusive, unless so stated or as will be readily apparent to those of ordinary skill in the art having the benefit of this disclosure. Thus, a variety of combinations and/or integrations of the embodiments and examples described herein may be included, as well as further embodiments and examples as defined within the scope of all claims based on this disclosure, as well as all legal equivalents of such claims.

As used herein, "axial" and "longitudinal" refer to any rectilinear direction at least approximately parallel to a rotational axis of a rotary component with which non-rotary components of a rotary assembly under discussion are sealingly engaged (for clarity of description being referred to hereafter simply as "the rotary axis"); "radial" refers to directions extending at least approximately along any straight line that intersects the rotary axis and lies in a plane transverse to the rotary axis; "tangential" refers to directions extending at least approximately along any straight line that does not intersect the rotary axis and that lies in a plane transverse to the rotary axis; and "circumferential" or "rotational" refers to any curve line that extends at least approximately along an arcuate or circular path described by angular movement about the rotary axis of a point having a fixed radial spacing from the rotary axis during the annular movement. "Rotation" and its derivatives mean not only continuous or repeated rotation through 360° or more, but also includes angular or circumferential displacement of less than a full revolution.

As used herein, "forwards" and "downhole" (together with their derivatives) refer to axial movement or relative axial location closer to the drill bit 114, away from the surface. Conversely, "backwards," "rearwards," and "uphole" (together with their derivatives) refer to axial movement or relative axial location closer to the surface, away from the drill bit 826 (see FIG. 8). Note that in each of FIGS. 1-7, the respective views depicted such that the downhole direction extends from left to right.

In the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Many embodiments may be realized. Several examples will now be described.

In Example 1, a device can comprise: a housing having a longitudinal dimension; a linear actuator including; a casing coupled to the housing; an actuator shaft having an exterior surface and configured to be longitudinally translated relative to the casing; a seal assembly engaging the housing and sealingly engaging the exterior surface; and a motor assembly disposed within the housing, the motor assembly including a motor case and a motor shaft, the motor shaft configured to rotate one of the seal assembly or the actuator shaft.

In Example 2, the device of Example 1 can optionally be configured such that the seal assembly includes a ring gear, the ring gear movably coupled to the motor shaft.

In Example 3, the device of Example 2 can optionally be configured such that the seal assembly sealingly engages an inside surface of the housing.

In Example 4, the device of any one or any combination of Examples 1-3 can optionally be configured to further comprise a first seal retainer and a second seal retainer, the first and second seal retainers coupled to the housing.

In Example 5, the device of Example 4 can optionally be configured such that a distance between the first seal retainer and the second seal retainer is configured to allow the seal assembly to translate along a longitudinal axis of the actuator shaft.

In Example 6, the device of any one or any combination of Examples 1-5 can optionally be configured such that the motor case is stationary relative to the housing.

In Example 7, the device of Example 1 can optionally be configured such that the motor shaft is movably coupled to the actuator shaft.

In Example 8, the device of Example 7 can optionally be configured such that the motor assembly includes a motor gear coupled to the motor shaft and the actuator shaft and the motor gear include mating splined surfaces.

In Example 9, the device of Example 1 can optionally be configured such that the motor case is movably coupled to the housing allowing linear translation of the motor assembly relative to the housing, and the motor shaft is fixedly coupled to the actuator shaft.

In Example 10, the device of Example 9 can optionally be configured such that the motor case and the housing include mating splined surfaces.

In Example 11, the device of any one or any combination of Examples 1-10 can optionally be configured such that the motor assembly includes a gear box.

In Example 12, the device of any one or any combination of Examples 1-11 can optionally be configured such that the seal assembly includes a seal case, an inner seal sealingly engaging the exterior surface, and an outer seal sealingly engaging an inside surface of the housing.

In Example 13, in a downhole tool assembly system, the system can comprise: a tool assembly including: a housing having a longitudinal dimension; a linear actuator including; a casing coupled to the housing; an actuator shaft having an exterior surface and configured to be linearly translated along a longitudinal axis relative to the casing; a seal assembly engaging the housing and sealingly engaging the exterior surface; and a motor assembly disposed within the housing, the motor assembly including a motor case and a motor shaft, the motor shaft configured to rotate one of the seal assembly or the actuator shaft.

In Example 14 the downhole tool assembly system of Example 13 can optionally be configured such that the tool assembly may be either a drillstring tool or a wireline tool.

In Example 15 the downhole tool assembly system any one or any combination of Examples 13-14 can optionally be configured such that the seal assembly includes a seal case, the seal case retaining an outer seal that sealingly engages an inside surface of the housing and the seal case retaining an inner seal that sealingly engages the exterior surface.

In Example 16 the downhole tool assembly system any one or any combination of Examples 13-15 can optionally be configured to further comprise a first seal retainer and a second seal retainer, the first and second seal retainers coupled to the housing, wherein a distance between the first seal retainer and the second seal retainer is configured to allow the seal assembly to translate along a longitudinal axis of the actuator shaft.

In Example 17 the downhole tool assembly system any one or any combination of Examples 13-16 can optionally be configured such that the seal assembly includes a ring gear, the ring gear configured to be rotated by the motor assembly.

In Example 18 the downhole tool assembly system of Example 13 can optionally be configured such that the motor case is movably coupled to the housing allowing linear translation of the motor assembly relative to the housing, and the motor shaft is fixedly coupled to the actuator shaft.

In Example 19, a device for a downhole system can comprise: a housing having a longitudinal dimension; a linear actuator including; a casing coupled to the housing; an actuator shaft having an exterior surface and configured to be longitudinally translated relative to the casing; a seal assembly engaging the housing and sealingly engaging the exterior surface; and a helical cam assembly having a first portion coupled to the actuator shaft and a second portion coupled to the housing, wherein the helical cam rotates the actuator shaft when the actuator shaft is translated.

In Example 20, the device for a downhole system of Example 19 can optionally be configured such that the first portion is integral with the shaft.

In Example 21, the devices or systems of any one or any combination of Examples 1-20 can optionally be configured such that all elements, operations, or other options recited are available to use or select from.

Additional aspects and advantages will be apparent from the following detailed description of example embodiments, which proceeds with reference to the accompanying drawings.

This disclosure is intended to cover any and all adaptations or variations of various embodiments. Combinations of the above embodiments, and other embodiments not specifically described herein, will be apparent to those of skill in the art upon reviewing the above description.

What is claimed is:

1. A device comprising:
  a housing having a longitudinal dimension;
  a linear actuator including a casing coupled to the housing and an actuator shaft having an exterior surface and configured to be longitudinally translated relative to the casing;
  a seal assembly engaging the housing and sealingly engaging the exterior surface;
  a motor assembly disposed within the housing, the motor assembly including a motor case and a motor shaft, the motor shaft configured to rotate one of the seal assembly or the actuator shaft; and
  a first seal retainer coupled to the housing;
  wherein the seal assembly includes a seal case, an inner seal sealingly engaging the exterior surface, and an outer seal sealingly engaging an inside surface of the housing.

2. The device of claim 1, wherein the seal assembly includes a ring gear, the ring gear movably coupled to the motor shaft.

3. The device of claim 2, wherein the seal assembly sealingly engages an inside surface of the housing.

4. The device of claim 1, further comprising a second seal retainer coupled to the housing.

5. The device of claim 4, wherein a distance between the first seal retainer and the second seal retainer is configured to allow the seal assembly to translate along a longitudinal axis of the actuator shaft.

6. The device of claim 1, wherein the motor case is stationary relative to the housing.

7. The device of claim 1, wherein the motor shaft is movably coupled to the actuator shaft.

8. The device of claim 7, wherein the motor assembly includes a motor gear coupled to the motor shaft and the actuator shaft and the motor gear include mating splined surfaces.

9. The device of claim 1, wherein the motor case is movably coupled to the housing allowing linear translation of the motor assembly relative to the housing, and the motor shaft is fixedly coupled to the actuator shaft.

10. The device of claim 9, wherein the motor case and the housing include mating splined surfaces.

11. The device of claim 1, wherein the motor assembly includes a gear box.

12. The device of claim 1, wherein the seal assembly is configured to maintain separation of fluids between an interior of the housing and an exterior of the housing.

13. A downhole tool assembly system, the system comprising:
  a tool housing including:
    a housing having a longitudinal dimension;
    a linear actuator including a casing coupled to the housing and an actuator shaft having an exterior surface and configured to be linearly translated along a longitudinal axis relative to the casing;
    a seal assembly engaging the housing and sealingly engaging the exterior surface; and
    a motor assembly disposed within the housing, the motor assembly including a motor case and a motor shaft, the motor shaft configured to rotate one of the seal assembly or the actuator shaft;
    wherein the motor case is movably coupled to the housing allowing linear translation of the motor assembly relative to the housing, and the motor shaft is fixedly coupled to the actuator shaft; and
    wherein the motor case and the housing include mating splined surfaces.

14. The downhole tool assembly system of claim 13, wherein the tool housing is a drillstring tool or a wireline tool.

15. The downhole tool assembly system of claim 13, wherein the seal assembly includes a seal case, the seal case retaining an outer seal that sealingly engages an inside surface of the housing and the seal case retaining an inner seal that sealingly engages the exterior surface.

16. The downhole tool assembly system of claim 13, further comprising a first seal retainer and a second seal retainer, the first and second seal retainers coupled to the housing, wherein a distance between the first seal retainer and the second seal retainer is configured to allow the seal assembly to translate along a longitudinal axis of the actuator shaft.

17. The downhole tool assembly system claim 13, wherein the seal assembly includes a ring gear, the ring gear configured to be rotated by the motor assembly.

18. A device for a downhole system comprising:
  a housing having a longitudinal dimension;
  a linear actuator including a casing coupled to the housing and an actuator shaft having an exterior surface and configured to be longitudinally translated relative to the casing;
  a seal assembly engaging the housing and sealingly engaging the exterior surface; and
  a helical cam assembly having a first portion coupled to the actuator shaft and a second portion coupled to the housing, wherein the helical cam rotates the actuator shaft when the actuator shaft is translated;
  wherein the seal assembly includes a seal case, an inner seal sealingly engaging the exterior surface, and an outer seal sealingly engaging an inside surface of the housing; and
  wherein the seal assembly is configured to maintain separation of fluids between an interior of the housing and an exterior of the housing.

19. The device of claim 18, wherein the first portion is integral with the shaft.

20. The device of claim 18, further comprising a first seal retainer and a second seal retainer, the first and second seal retainers coupled to the housing, wherein a distance between the first seal retainer and the second seal retainer is configured to allow the seal assembly to translate along a longitudinal axis of the actuator shaft.

\* \* \* \* \*